(No Model.) 2 Sheets—Sheet 1.

A. F. WARD.
HOOP COILING MACHINE.

No. 349,243. Patented Sept. 14, 1886.

Attest:
John Schuman.

Inventor:
Alexander F. Ward.
by his Atty (No Model.) 2 Sheets—Sheet 2.

A. F. WARD.
HOOP COILING MACHINE.

No. 349,243. Patented Sept. 14, 1886.

Attest:
John Schuman.

Inventor:
Alexander F. Ward.
by his Atty

UNITED STATES PATENT OFFICE.

ALEXANDER F. WARD, OF DETROIT, MICHIGAN.

HOOP-COILING MACHINE.

SPECIFICATION forming part of Letters Patent No. 349,243, dated September 14, 1886.

Application filed March 25, 1886. Serial No. 196,486. (No model.)

*To all whom it may concern:*

Be it known that I, ALEXANDER F. WARD, of Detroit, in the county of Wayne and State of Michigan, have invented new and useful Improvements in Hoop-Coilers; and I do hereby declare that the following is a full, clear, and exact description thereof, reference being had to the accompanying drawings, which form a part of this specification.

This invention relates to a new and useful improvement in hoop-coiling machines; and the invention consists in an improved construction and arrangement of different parts of a hoop-coiling machine, and for which I have previously been granted Letters Patent Nos. 223,968 and 245,104.

Figure 2:
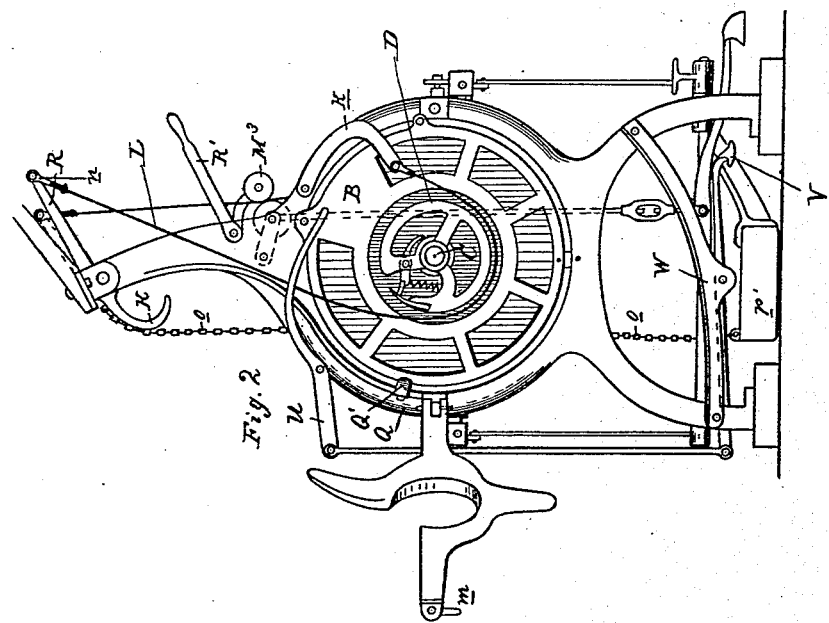
Figure 1:
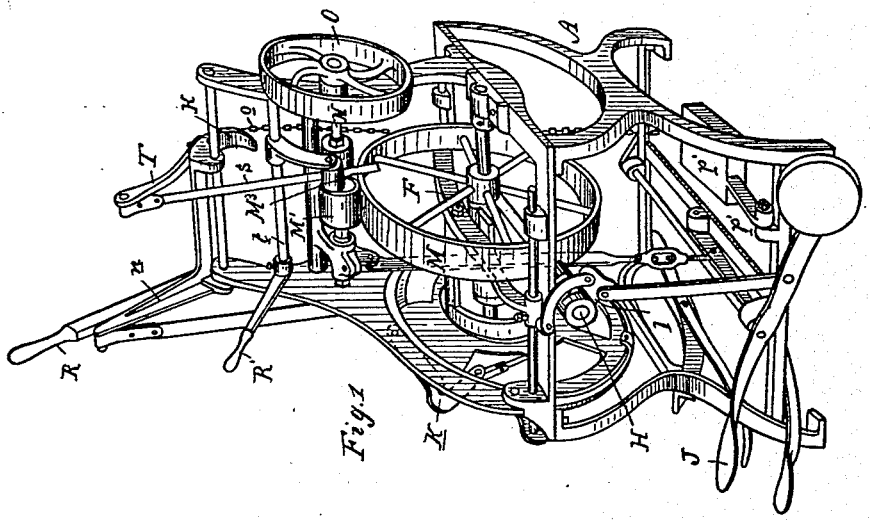
Figure 3:
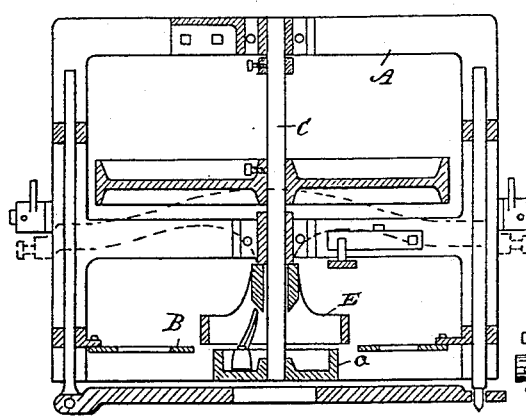
Figure 4:
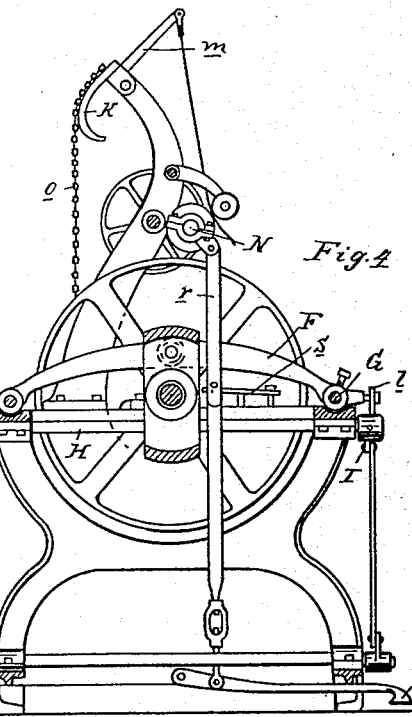
Figure 6:
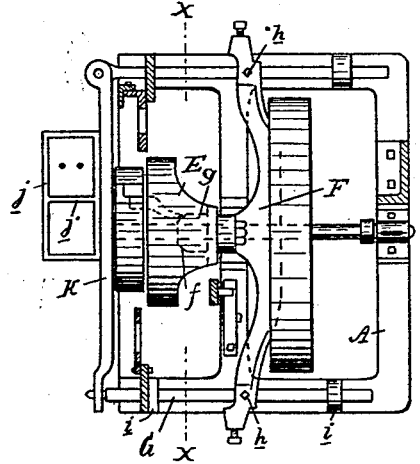
Figure 8:
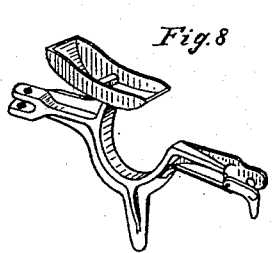
Figure 5:
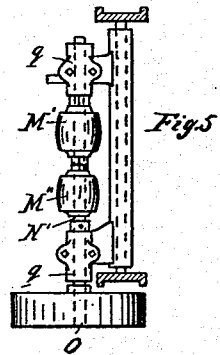
Figure 7:
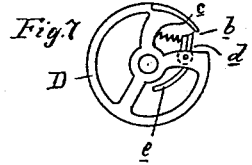

In the accompanying drawings, in which my machine is shown in the improved form hereinafter described, Figure 1 is a perspective view of the machine, looking toward the rear and one side thereof. Fig. 2 is a front elevation thereof. Fig. 3 is a horizontal central section on the axis of the coiling-head. Fig. 4 is a vertical cross-section on the line $x$ $x$ in Fig. 6. Fig. 5 is a plan of the oscillating counter carrying the friction-pulleys and driver. Fig. 6 is a horizontal section of the machine, similar to Fig. 3, with the parts carried by the main shaft shown in plan, however, instead. Fig. 7 is a detached elevation of the coiling-head. Fig. 8 is a detached perspective view of the hinged gate.

A is the frame of the machine, provided with suitable legs, and forming in front of the machine a circular opening, to which is secured the circular face-plate B, which is also provided with a circular opening, in the center of which is journaled in suitable bearings in the frame the main shaft C. To the front end of this shaft is secured the coiling-head D, provided with the circular rim $a$, projecting about the width from the face-plate, and upon which the hoops are coiled. An opening, $b$, is cut into the coiling-rim, and a polished piece of brass or other bright metal, $c$, is preferably secured at one side thereof, forming part of the rim, with the object of making the opening in the rim more plain to the eye when the coiler-head revolves. Within the coiler-head is secured the holding-dog $d$, arranged to nip the end of a hoop inserted through the opening $b$, and this dog has a tail-extensi⸱ which projects rearwardly and inwardl⸱ as to interfere with the beveled edge $f$ of hub $g$ when the latter is projected, the compelling the dog to release its hold. hub $g$ is carried by the endwise-sliding ⸱⸱ which in turn is carried by the cross-ba⸱⸱ which it is bolted. The ends of the cr⸱⸱ F form bearings, in which the sliding r⸱⸱ are adjustably secured by means of set-s⸱ $h$. The sliding bolts G are supported in⸱ ings $i$ on the frame, which permit the bo⸱ slide freely endwise. A gate, K, is hinge⸱ one end to one of the sliding bolts, and at⸱ opposite end it is secured to the other bolt means of a spring-latch, $m$, which permit⸱ door to be opened and closed at will.

To the outer face of the door is secur⸱ nail-box $j$, provided with a division-w⸱ which forms a separate receptacle for th⸱ of the hammer and prevents the handle hammer from dropping onto the nails ⸱ other receptacle, in which the nails are c⸱ By this means the frequent spilling of n⸱ the dropping of the hammer onto the na prevented.

Underneath the cross-head F is su⸱ journaled the rock-shaft H, having roc⸱ I, which are actuated by means of a w⸱ foot-lever, J, arranged underneath and s⸱ connected therewith. These rock-ar⸱ also connected by means of links $l$ w⸱ ends of the cross-bar F, all so arranged depressing the foot-lever J the whole ⸱ formed by the sliding bolts G, cross-h⸱ ram E, and door K is pushed a certain d toward the front. This movement pu⸱ annular head $f$ of the ram through an⸱ opening between the face-plate and the⸱ head, and also forces the dog $e$ to rele⸱ hold by its impingement with the bevele⸱ $f$ of the hub $g$. The latter does not sli⸱ the main shaft, but is provided with a ciently large bore to keep out of any fri⸱ contact therewith. This arrangement all the weight of the sliding parts a scribed upon the sliding bolts, and t⸱ if the main shaft is slightly thrown ou⸱ by the wearing away of the bearings⸱ other causes, no internal friction or bi⸱ the parts can occur.

L is the tension-strap, which bears against loop in coiling. It consists of a steel band width of the hoop, and is secured pivotally one end to the link k and at its other end to end of the rock-arm n. The rock-arm n, ich has a hand-lever, R, secured to it, actu- s the cam K to lift, by means of a chain or pe, o, the weight p, which rests normally up- the floor, and is hinged at p' to the frame of machine.

I is a friction-wheel secured upon the main ft, and N is a counter-shaft journaled above swinging boxes q, and carrying the friction-ions M' M'' and the drive-pulley O. The ging boxes q are secured to a rock-shaft, journaled upon a bolt passing through the ne. A connecting-rod, r, provided with ns for adjusting its length, connects one of swinging boxes q with a foot-lever, P, and adjustable tension-spring, s, acting upon the necting-rod r, normally keeps the friction-el M' out of contact with the friction-wheel except when the foot-lever P is forcibly de-ssed.

R' is a hand-lever secured upon a rock-shaft, o which is also secured a rock-arm carrying small friction-pinion, M''', which, by means the lever R', can be thrown in and out of ntact with the friction-pinion M''. A strap, secured to the end of a rock-arm, T, hangs nward between the friction-pinions M'' all so arranged that when the lever R' is ly depressed by the operator the strap nipped between the friction-wheels M''' d forcibly drawn down, and, by means connection, rocks the cam K, thereby ing up on the chain o and lifting the t p.

the front face of the frame of the ma-e, and near the outer edge of the face-plate secured the curved guide-flange Q, which ets about the width of a hoop over the late, and has secured to it an overhang-nge, Q', all so arranged that at a certain in the operation of coiling the tension-s caught under the overhanging flange cannot be displaced in pushing off the a lever pivotally secured to the front f the frame. Its free inner end termi- a finger, which, by means of the foot- and suitable connection therewith, orcibly depressed upon the end of the oil to hold that end firmly down on the secure it by nailing.

is a curved rail secured to the front side machine underneath the coiling-head, t the coil of hoops when pushed off the g-head will drop onto it, and receive an impetus which will set it to roll-y from the machine.

actice, the machine being constructed ranged as described, the operator sets ing-head to revolving by placing his foot lever P, then thrusting one end of a rough the opening b, gets it nipped by ; when immediately the coiling-head will coil it around its rim, while the operator quickly inserts the usual number of other hoops one after another into the open end of the coil. While the hoops are thus coiled the tension-strap bears against the outer face of the coil with the tension produced by the weight p, which, as the coil enlarges, is gradually lifted higher, but the tension produced by it is gradually diminishing, owing to the decreasing leverage of the cam K. Thus the tension is kept adequate to the requirements, diminishing as the coil increases in use, instead of being uniform during the whole operation, and by this means considerable power is saved. Upon the sides the coil is confined between the face-plate D and the inner face of the gate, which latter has slight rounding projections formed thereon to reduce the friction, which is principally against the face. If the space between these parts has to be increased for wider hoops, the necessary adjustment is obtained by means of the set-screws h, which permit of projecting the bolts G any distance to form the required clearance between the face-plate and gate. As soon as the coil is formed the operator takes his foot off the lever P and places it on the lever V, thereby pressing down the free end of the last hoop, which is then nailed down, after which the operator, taking hold of the hand-lever R and depressing it, releases the coil from the tension-strap, being aided thereby by the curved flange Q, against which the tension-strap is held, and by placing his foot now on the foot-lever J he actuates the ram to push off the coil, which drops on the curved rail and rolls away. The tension-strap is prevented from being displaced by the overhanging flange Q', which engages it.

Instead of releasing the tension-strap by means of the lever R, which requires the exertion of considerable force, the operator can use power by simply depressing the lever R', which, by means of the connection heretofore described, draws down the strap S, and thereby performs the operation by power, and thereby lightens the work of the operator to a large extent.

It will be observed that the lever U, with its actuating foot-lever, forms at all times, whether the coil is larger or smaller, a reliable means for firmly pressing down the free end of the last hoop, for the purpose of securing it by a nail or nails. By curving the rail W at its higher end a much larger impetus is gained than with a straight inclined rail for rolling away the coil.

The polished brass plate c is a great help to the operator, especially with dim light, to readily distinguish the spot, while the coiling-head is revolving, where to insert his first hoop; and this device permits of running the coiler-head at a higher rate of speed.

The arrangement of the cross-bar F at about midway between the bearings of the sliding rods G has several advantages, of which I will simply mention the following: It distributes the weight equally, leaves the rear end of the machine unobstructed to run a belt from any direction to the drive-pulley N, and it moves the ram with little friction and lost motion.

What I claim as my invention is—

1. The combination, with the frame A and the coiling-head, of the curved rail W, secured to said frame beneath the coiling-head, the foot-lever V, pivoted to said curved rail, the curved lever U, pivoted to the frame and terminating in a finger, and a rod connecting said lever V directly with the lever U, substantially as shown and described.

2. In a hoop-coiling machine, in combination with the tension-strap and the face-plate B, the guide-flange Q, secured near the outer edge of said face-plate, and having the overhanging flange Q', all arranged to keep the tension-strap from being displaced in removing the coil, substantially as described.

3. In a hoop-coiling machine, the combination, with the ram E, of a cross-bar, F, secured to its rear side transversely the frame and carrying said ram, and of the sliding bolts G, adjustably secured in bearings to the end of said cross-bar and having bearings $i$ upon opposite sides of said cross-bar, and a gate, K, hinged at one end to one of said bolts, substantially as described.

4. In a hoop-coiling machine, the combination, with the main shaft C, of the sliding bolts G, having bearings $i$, the cross-bar F, the ram E, carried by said cross-bar, and the hub $g$, carried by the ram and having an enlarged opening, through which the main shaft passes, and a beveled edge, $f$, substantially as and for the purpose described.

5. In a hoop-coiling machine, the combination, with the friction-wheel M and the coiling mechanism operated thereby, of the friction-pinion M' and its swinging frame, the adjustable tension-spring $s$, to normally keep the swinging frame in its adjusted position, the rock-arm T, and the strap S, carried thereby, substantially as described.

6. In a hoop-coiling machine, the combination, with the coiling mechanism and the tension-strap L, of the curved cam K, pivoted to the frame and connected at one end with said tension-strap, and intermediate connections, substantially as described, for producing a decrease of tension on said strap as the coiling progresses, as set forth.

7. In a hoop-coiling machine, the combination, with the tension-strap L, of a power device such as formed by the combination of the friction-wheels M", M''', carried by the shafts N $t$, respectively, strap S, the free end of which hangs between said friction-wheels, and lever R', secured on said shaft and constructed to release the tension of the tension-strap, substantially as described.

ALEXANDER F. WARD.

Witnesses:
H. S. SPRAGUE,
CHAS. THURMAN.